June 28, 1938.    M. MALLORY    2,121,920
INTERNAL COMBUSTION ENGINE
Filed Feb. 8, 1937
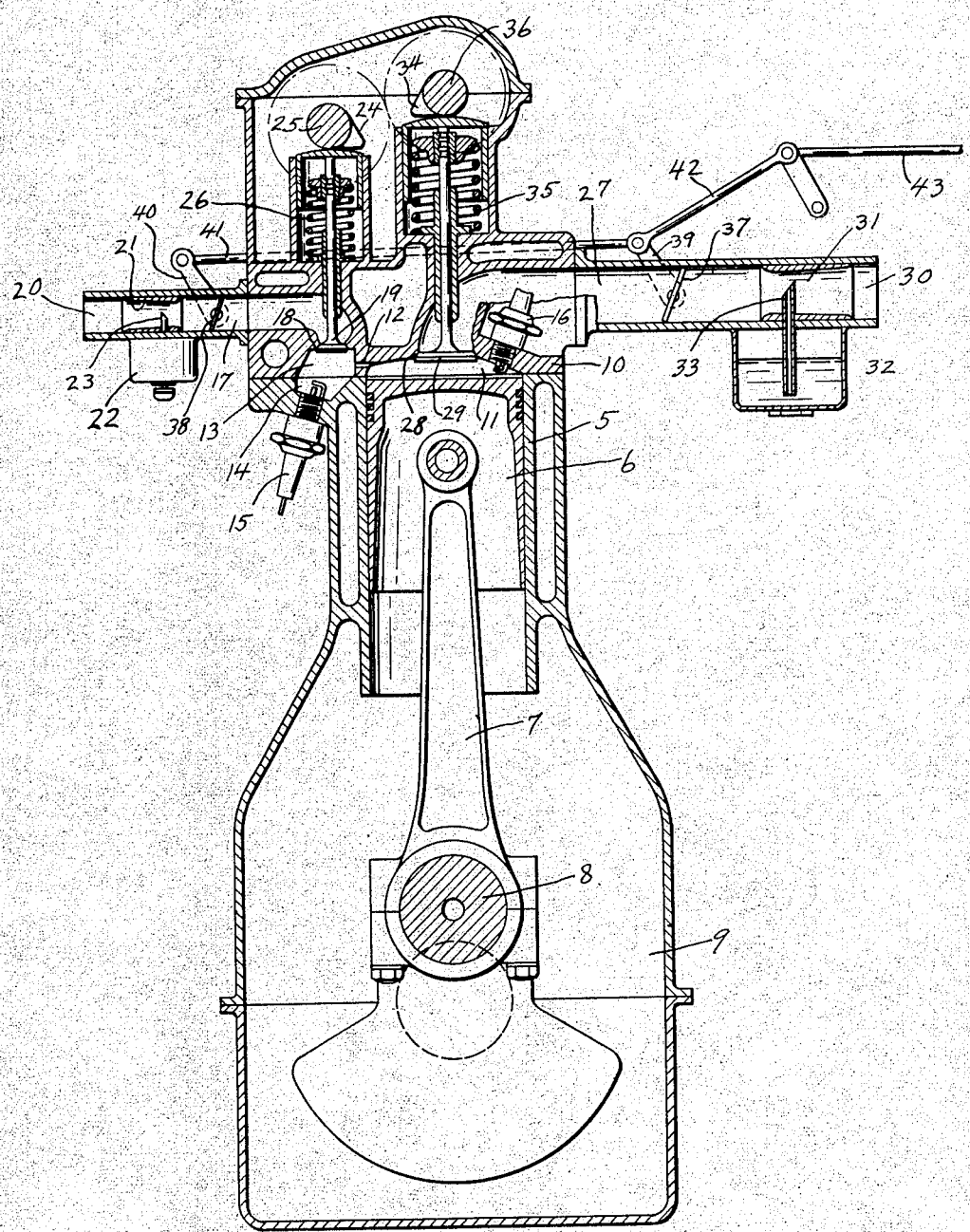
Inventor
Marion Mallory
E. N. Lovewell
By
Attorney Patented June 28, 1938

2,121,920

UNITED STATES PATENT OFFICE 2,121,920

INTERNAL COMBUSTION ENGINE

Marion Mallory, Detroit, Mich.

Application February 8, 1937, Serial No. 124,772

5 Claims. (Cl. 123—75)

This invention relates to improvements in internal combustion engines of the type which includes a spark plug in a firing chamber, said firing chamber being located adjacent the cylinder and adapted to be supplied from a carburetor with a charge that varies in volume of air and fuel only (not mixture ratio) as the throttle is varied, and the cylinder receives a throttle charge that varies in air and mixture only (not mixture ratio) as the throttle is varied. The throttles controlling the two charges are mechanically operated and synchronized to operate at the same time. The explosion from the firing chamber serves as a pilot lighter to ignite the main charge in the cylinder.

The principal object of the invention is to provide a simple and improved means whereby a small combustible charge, which increases in volume as the throttle is opened, is ignited by an electric spark and the flame from the small charge ignites a larger charge, which is throttled in the same manner and in unison with the small charge, causing the expansion of the large charge to be more instantaneous, thereby making possible much less spark advance and expanding the gases within the cylinder much more rapidly and at a time when the piston is just starting downward on its power stroke.

Another object of the invention is to provide ignition means whereby the spark ignites a small portion of the charge in the small combustion chamber, having restricted outlet, into the large combustion chamber. The restriction is sufficiently high to cause the high pressure to build up in the small combustion chamber, which causes a flame of high velocity to be discharged into the large combustion chamber, which in turn makes possible more complete combustion, burning of leaner mixtures or inferior mixtures, and at the same time makes possible the use of higher compression engines using colder charges than can possibly be used with the conventional type of engine.

A still further object is to provide an engine that will operate on a large per cent of fuel oil, kerosene or the like, and a small per cent of gasoline mixture to ignite the fuel oil or kerosene, and to provide means to prevent the fuel oil from commingling with the gasoline mixture.

A still further object is to provide an engine whereby a small portion of the mixture will be heated so that it will be easily ignited by an electric spark, and the exhaust from the explosion will ignite the main or larger and colder charge that is drawn into the engine.

The invention will be more particularly described in connection with the accompanying drawing, which is a vertical section taken centrally through one of the engine cylinders, the intake manifolds and carburetors.

The drawing shows one of the engine cylinders 5 in which a piston 6 is reciprocable by means of a piston rod 7 connected with a crank shaft 8 operating in the usual manner in a crank case 9. It is to be understood that the engine may have any desired number of cylinders. The cylinder head 10 is formed above the cylinder 5 with a chamber 11 connected by a restricted port 12 with a primary firing chamber 13 and the bottom 14 of this chamber formed in the cylinder block is adapted to receive a spark plug 15. The cylinder head may also be provided with a spark plug for the large combustion chamber if desired, as shown at 16.

Fuel mixture is supplied to the chamber 13 from an intake manifold 17 through an inlet port 18, which is controlled by a valve 19. An air passageway 20 leads to the manifold 17 and is provided with a venturi 21, into which a small carburetor 22 is adapted to discharge fuel through a nozzle 23. The valve 19 is adapted to be opened by a cam 24 disposed on a cam shaft 25, which is driven at one half crank shaft speed, and to be closed by a spring 26.

Fuel mixture is supplied to the cylinder 5 from a manifold 27 through a main intake port 28, which is controlled by a valve 29. An air passageway 30 leads to the manifold 27 and is provided with a venturi 31 into which a carburetor 32 is adapted to discharge fuel through a nozzle 33. The valve 29 is adapted to be opened by a cam 34 and to be closed by a spring 35. The cam 34 is disposed on a cam shaft 36, which is geared to the shaft 25 and rotates at the same speed. It is deemed unnecessary to show the exhaust port and valve for the cylinder, since they are of conventional construction and do not constitute a part of the invention.

The charges supplied to the cylinder 5 and the primary firing chamber 13 are respectively controlled by throttle valves 37 and 38 which have arms 39 and 40 connected by a rod 41, so that the two valves open and close in unison, one end of the rod 41 being connected by a link 42 or other suitable means to a throttle operating rod 43.

In the construction shown in the drawing, the charge supplied to the primary firing chamber 13 is primarily for idling or for providing by its combustion a flame which surges into the cylinder 5 to serve as a pilot lighter for the charge therein. Assuming that there is gasoline in the carburetor 22 and fuel oil in the carburetor 32, when both throttle valves are nearly closed for idling, fuel mixture of normal proportions will be drawn into the primary firing chamber 13 but the small current of air flowing past the valve 37 will not have sufficient velocity at the nozzle 33 to draw fuel oil therefrom.

In idling, therefore, a normal combustible mixture is supplied to the chamber 13 and a very small quantity of air to the cylinder. There will be under these conditions a very small amount of mixture drawn out of restriction 12 from the firing chamber 13. This mixes with the small amount of air that is drawn in past the valve 37, but the resulting mixture is so lean that it will hardly ignite by an electric spark. It will be ignited, but the burning will be very slow. However, the flame from the explosion in the primary combustion chamber will cause the ignition to be more nearly instantaneous.

It should be borne in mind that the restricted port 12 is small as compared to the venturi 21 and the opening of the valve 19, so that during the suction stroke, the vacuum in the cylinder runs appreciably higher than the vacuum in the chamber 13, and there will be substantially no back flow or mixing of the charge that is in the large cylinder with the charge that is in the firing chamber. In other words, the mixture in the firing chamber will remain of substantially the same proportions of air and fuel as it was when it came from the small carburetor.

As shown in the drawing, the valve 19 opens and closes at the same time as the valve 29. The passageway through the carburetor 22, the intake port 18 and the restricted port 12 are of such capacity as compared to the intake port 28 that the chamber 13 is substantially filled with an easily ignitable mixture when the piston has reached the end of its intake stroke so as to eliminate excessive overflow from the chamber 13 into the cylinder where it would mix with the air and bring the charge in the cylinder up to the same mixture ratio as that in the small firing chamber.

As the throttle valves 37 and 38 are moved toward open position, the velocity through the venturi 31 will be increased, causing a fuel oil mixture to be drawn into the cylinder. The velocity and the rate of charge through the venturi 21 will also be increased, but the mixture ratio will not be materially changed.

In my engine, a normal combustible mixture is throttled to the small firing chamber, which increases in volume (not richness) as the throttle is opened, and at the same time, a mixture is throttled into the cylinder, which increases in volume only (not richness) as the throttle is opened. Of course, the large charge can be somewhat leaner than normal. In fact it can be an inferior mixture which is difficult to ignite, such as fuel oil, kerosene or the like, and the flame caused by the explosion of a normal mixture in the small firing chamber will ignite it, causing instantaneous combustion.

It will be seen that by the construction of my engine the mixture in the large cylinder, regardless of what it is, will never be drawn back into the firing chamber by the suction stroke. This is due to conditions which will now be explained.

Restriction 12 is always greater than the restriction between the firing chamber and the atmosphere, especially when the throttle valve 38 is slightly open, which is necessary for idling. This condition causes the vacuum to be always higher in the cylinder than it is in the firing chamber. Consequently, the passage of mixture through the firing chamber is always in one direction, namely, toward the cylinder. Even though some of the mixture is drawn out of the firing chamber into the cylinder, there will never be any back flow from the cylinder into the firing chamber.

On the compression stroke, there will be practically no charge from the large cylinder forced back into the small combustion chamber, due to the high restriction between them and due to the difference of pressures between the cylinder and the firing chamber. The firing chamber pressure is always nearer than the cylinder to atmospheric pressure when the compression has started. This condition is very important. In fact, it is absolutely necessary to maintain a normal mixture in the firing chamber; that is, a mixture of the same proportions of air and liquid fuel that entered it. The vacuum in the cylinder must always be higher than in the firing chamber under all operating conditions, and this is accomplished by the high restriction 12 between the firing chamber and the cylinder, the simultaneous operation of the valves 37 and 38, and the simultaneous operation of the valves 19 and 29. If a fixed restriction were used in place of the valve 38, the vacuum in the firing chamber would increase as the engine speed increased, which would result in the vacuum between the two chambers becoming more equally balanced, or if the valve 18 were a spring-loaded suction-operated valve, the same condition would exist.

In the present construction, the vacuum in the cylinder and the firing chamber is lowered in harmony as the throttle valves 37 and 38 are opened, and increases in harmony as they are closed, causing the vacuum in the firing chamber to be always lower than in the cylinder under all operating conditions.

Where attempts were made by other inventors to admit all of the fuel mixture to a firing chamber and only air to the cylinder, it was necessary to provide a restriction between the cylinder and the firing chamber large enough to admit sufficient volume of fuel mixture to the cylinder for power. In this case, the restriction was so large that the vacuums were too nearly equally balanced, causing commingling of the air charge and the fuel mixture charge. In other words, if this restriction was made large enough to admit enough volume of fuel mixture, the engine was practically a conventional type of engine with the firing chamber having little advantage.

Furthermore, a large restriction reduces the pressure built up in the small firing chamber and, in turn, reduces the velocity of the flame into the cylinder to a point where it is of little or no advantage in accelerating combustion in the cylinder.

Another disadvantage of admitting all of the fuel mixture to the firing chamber is that it is necessary to enrich the fuel to increase power, and if the fuel is enriched enough to give full power, it will be entirely too rich in the small combustion chamber to be ignited by an electric spark. In fact, the spark plug will foul.

In my engine, the mixture is no richer in the firing chamber under load or power operation than it is under light loads, and even though nothing but air is throttled to the cylinder, the engine will carry up into a considerable power range from the small firing chamber when the throttles are opened, or if the mixture admitted to the cylinder is lean, the engine will carry further into a higher power range. By leaning the mixture in the large carburetor, the effect is not the same as leaning the mixture in a conventional engine. In other words, the engine will not miss. It will run normal up to a certain power range. It will be necessary only to open the throttles wider than they would be if a normal mixture were being admitted to the cylinder.

The action in my engine is similar to the operation of a small engine and a large engine. If only air or a lean mixture were admitted to the cylinder through the large carburetor, the engine would have the power of a small engine. If a normal mixture were admitted to the cylinder, the engine would have the power of a larger engine. This is desirable for some operators who do not desire so much speed and power but do desire economy. They have the performance of a small engine for economy or a large engine for power by simply adjusting the amount of liquid fuel admitted to the cylinder by the large carburetor. Means can be provided so that this liquid fuel can be adjusted from the operator's seat, if desired.

The above operations, which are made possible in this engine, would be impossible if the air were not throttled in synchronism to both the cylinder and the firing chamber. If the air were not throttled to the cylinder at low speeds, there would be only a small amount of fuel mixture coming into the firing chamber due to the throttle valve 38 being almost closed, and the high compression caused by the elimination of the throttle valve 37 would force air back into the firing chamber, causing dilution of the small amount of fuel mixture and ignition failure. Furthermore, the efficiency of the engine would be low, due to the small amount of power developed from the small amount of fuel mixture being utilized to drive the pistons against the high compression.

The elimination of the valve 37 would also cause the velocity to be very low through the venturi 21 and the vacuum to be very low in the firing chamber. This would result in very poor atomization of the fuel. It would be poorly atomized coming out of the nozzle and would become condensed in the manifold and the firing chamber, because there would not be enough vacuum to cause it to remain suspended.

This engine is not a constant compression engine; nor does it feed all of the fuel mixture to a small firing chamber. It develops greater power from normal mixtures, due principally to more instantaneous expansion of the gases in the cylinder, and at a time when the piston is nearer to its power stroke than in the conventional type of engine, when the expansion starts to take place. This alone makes higher compression possible without detonation, thus making this engine still more powerful for the amount of fuel used.

Another advantage offered by this engine is that the hot flame ignition eliminates the necessity of running the engine at a high temperature, as is done in common practice. Even though the engine is run at a lower temperature and in cold weather, the burning of the main charge will not be so slow as to cause spitting and loss of power.

With the construction herein shown, it is possible to burn fuel oil successfully and obtain complete combustion, but for idling, the engine burns only gasoline mixture supplied from the carburetor 22. This prevents fouling of spark plugs, which would inevitably occur if idling were attempted on fuel oil. As the throttle is opened, fuel mixture gradually increasing in amount will be supplied from the carburetor 32 to the cylinder. This mixture in the cylinder will be ignited by the flame which surges through the port 12 following the ignition of the charge in the chamber 13.

In this engine, fuel oil can be used in both carburetors when the engine is started on gasoline through the small carburetor, provided that the fuel oil mixture passing into the firing chamber is heated to a high temperature. Fuel oil will ignite easily if the charge is heated, but it is not desirable to heat the complete charge that goes into the engine if fuel oil is used, because there will be a loss in power in the engine, whereas if only a small portion of the fuel oil charge is heated, the power loss would be small.

In this engine, either fuel oil or gasoline may be used in the carburetor 32 with a leaner mixture and consequently with greater economy than in the conventional engine. The mixture in the cylinder may be too lean to be instantaneously ignited by a spark plug and yet it would be rapidly expanded and completely burned by the flame from the chamber 13.

It will be noted that in idling and under light loads, the small carburetor will carry the engine up into quite a speed range, and as the velocity increases through the large venturi 21, fuel will be drawn out of the nozzle 33 and the power will be increased. The mixture coming from the carburetor 32 can be varied so that it is very lean and still the engine will not miss,—only the power will be decreased. If the mixture were completely shut off at the nozzle 33, the engine would operate as a small engine, developing low horse power rating, and if the mixture were brought up to normal in the carburetor 33, the engine would develop its full power. In other words, if the operator desires the greatest economy, he can make the mixture lean in the large carburetor, or even shut it off, and the engine will operate perfectly, developing the power from the mixture coming in through the small carburetor.

In the event that the same kind of fuel is used in both carburetors, it is not necessary to have two carburetor bowls. Both nozzles 23 and 33 could be fed out of one bowl, and the carburetors could be built as a single unit, side by side. It is not necessary to place one on each side of the engine.

If desired, an injector can be used in place of the large carburetor 32 so as to inject fuel into the cylinder on the compression stroke, or inject fuel into the large manifold just above the intake valve on the suction stroke.

It is to be understood that the invention is not limited to the specific fuel supply means herein shown and described, but includes all such modifications as may be embraced within the scope of the appended claims.

Having thus described the invention, what I claim as new and desire to secure by Letters Patent, is:—

1. An internal combustion engine comprising a cylinder having an intake port, a piston reciprocable in said cylinder, a primary firing chamber adjacent the upper end of the cylinder and having an intake port, means for charging said cylinder and said chamber from separate sources, each charging means including a carburetor with a throttle valve on the engine side thereof, a constantly open port between said chamber and the upper end of the cylinder which is more restricted than the intake leading to said chamber, electrical means for igniting the charge in the primary firing chamber and by the explosion thereof igniting the charge in the cylinder, and means linking the throttle valves to cause them to open and close in unison.

2. An internal combustion engine comprising a cylinder having an intake port, a piston reciprocable in said cylinder, a primary firing chamber adjacent the upper end of the cylinder and having an intake port, means for charging the cylinder and the primary firing chamber from separate sources, each charging means including a carburetor with a throttle valve on the engine side thereof, valves for the respective intake ports, mechanical means for opening and closing said intake valves, a constantly open port between said firing chamber and the upper end of the cylinder, means for maintaining a higher vacuum in the cylinder than in the primary firing chamber during the entire intake stroke of the piston, electrical means for igniting the charge in the primary firing chamber and by the explosion thereof igniting the charge in the cylinder, and means linking the throttle valves to cause them to open and close in unison.

3. An internal combustion engine comprising a cylinder having an intake port, a piston reciprocable in said cylinder, a primary firing chamber adjacent the upper end of the cylinder and having an intake port, means for charging said cylinder and said chamber from separate sources, each charging means including a carburetor with a throttle valve on the engine side thereof, valves for the respective intake ports, mechanical means for opening and closing said intake valves in timed relation to each other, a constantly open port between said chamber and the upper end of the cylinder which is more restricted than the intake passage leading to said chamber, electrical means for igniting the charge in the primary firing chamber and by the explosion thereof igniting the charge in the cylinder, and means linking the throttle valves to cause them to open and close in unison.

4. An internal combustion engine comprising a cylinder having an intake port and valve, a primary firing chamber having an intake port and valve and also having a restricted communication with the upper end of the cylinder, a carburetor connected with each intake port, electrical means for igniting the charge in the primary firing chamber and by the explosion thereof igniting the charge in the cylinder, a throttle valve between each carburetor and the intake port to which it is connected, and means to operate said throttle valves simultaneously to lower the vacuum and increase the volume of the charges proportionately to both the firing chamber and the cylinder.

5. An internal combustion engine comprising a cylinder having an intake port and valve, a primary firing chamber having an intake port and valve and also having a communicating port into the upper end of the cylinder, a piston reciprocable in said cylinder, a separate carburetor connected with each intake port, electrical means for igniting the charge in the primary firing chamber and by the explosion thereof igniting the charge in the cylinder, a throttle valve between each carburetor and the intake port to which it is connected, said communicating port being so restricted that the vacuum is higher in the cylinder than in the primary firing chamber during substantially all of the intake and compression strokes, and means to operate said throttle valves simultaneously to lower the vacuum and increase the volume of the charges proportionately to both the primary firing chamber and the cylinder.

MARION MALLORY.